United States Patent [19]

Katin et al.

[11] Patent Number: 5,261,098

[45] Date of Patent: Nov. 9, 1993

[54] METHOD AND APPARATUS FOR DERIVING OBJECT TYPE AND OBTAINING OBJECT TYPE ATTRIBUTE VALUES

[75] Inventors: Neil Katin, Los Gatos, Calif.; Ruthellen Leventer, Potomac, Md.; Eswar Priyadarshan, Reading; Alan Ruberg, Arlington, both of Mass.; Sami Shaio, Palo Alto, Calif.

[73] Assignee: Sun Microsystems, Inc., Mountain View, Calif.

[21] Appl. No.: 751,866

[22] Filed: Aug. 28, 1991

[51] Int. Cl.⁵ ............................ G06F 7/00; G06F 9/00
[52] U.S. Cl. .................................... 395/650; 395/600;
 364/280; 364/281.9; 364/282.1; 364/286
[58] Field of Search ............... 395/700, 695, 425, 400,
 395/600, 650

[56] References Cited

U.S. PATENT DOCUMENTS

| | | | |
|---|---|---|---|
| 4,660,142 | 4/1987 | Clancy et al. | 395/400 |
| 4,821,184 | 4/1989 | Clancy et al. | 395/425 |
| 4,841,433 | 6/1984 | Hakin et al. | 395/600 |
| 5,057,996 | 10/1991 | Cutler et al. | 395/650 |
| 5,075,847 | 12/1991 | Fromme | 395/700 |
| 5,129,084 | 7/1992 | Kelly, Jr. et al. | 395/650 |
| 5,133,075 | 7/1992 | Risch | 395/800 |
| 5,201,047 | 4/1993 | Maki et al. | 395/600 |

Primary Examiner—Gareth D. Shaw
Assistant Examiner—Kevin Spivak
Attorney, Agent, or Firm—Blakely Sokoloff Taylor & Zafman

[57] ABSTRACT

In a computer system where applications and data manipulated by the applications are implemented in an object oriented manner, an object type and its deriving attribute are stored as an entry in a table having an identifier. The object type table is in turn stored in a database. Similarly, the object type and its attribute values having corresponding attribute identifiers are stored as an entry in a table having an identifier. The object type attribute table is in turn also stored in a database. An object type deriving manager and an object type attribute values obtaining manager corresponding to the object type table and the object type attribute table are provided for deriving object type and obtaining object type attribute values respectively. A row getting interface routine and a column getting interface routine are provided for invoking the functions of the object type deriving manager and the functions of the object type attribute values obtaining manager. The object type is derived and the object type attribute values are obtained for an application upon receipt of the object type table identifier, the object type deriving attributes, the object type attribute table identifier, and the object type attribute identifiers from the application. As a result, applications are relieved of the burden of maintaining the necessary information for deriving object type and obtaining object type attribute values to improve interoperability between the applications.

24 Claims, 12 Drawing Sheets

OBJECT TYPE TABLE

| | | | |
|---|---|---|---|
| ENTRY 1 (76a) | DERIVING ATTR 1 | DERIVING ATTR 2 | OBJECT TYPE 1 |
| ENTRY 2 (76b) | DERIVING ATTR 1 | OBJECT TYPE 2 | |
| ⋮ | ⋮ | ⋮ | |
| ENTRY N (76c) | DERIVING ATTR 1 | ⋯ DERIVING ATTR M | OBJECT TYPE N |

OBJECT TYPE ATTRIBUTE TABLE (78)

| | | | | | |
|---|---|---|---|---|---|
| ENTRY 1 (80a) | OBJECT TYPE 1 | ATTR VALUE 1 | ATTR VALUE 2 | | |
| ENTRY 2 (80b) | OBJECT TYPE 2 | ATTR VALUE 1 | | | |
| ⋮ | ⋮ | ⋮ | | | |
| ENTRY N (80c) | OBJECT TYPE N | ATTR VALUE 1 | ATTR VALUE 2 | ⋯ | ATTR VALUE N |
| | | ATTR ID 1 (82a) | ATTR ID 2 (82b) | ⋯ | ATTR ID N (82c) |

*Figure 4b*

ROW INTERFACE

| OBJECT TYPE TABLE ID (84a) | OBJECT TYPE DERIVING ATTRIBUTES (84b) | OBJECT TYPE ENTRY ID (84c) |
|---|---|---|
| OBJECT TYPE ATTR TABLE ID (86a) | OBJECT TYPE (86b) | OBJECT TYPE ATTR ENTRY ID (86c) |

84 = top row; 86 = bottom row

*Figure 6a*

COLUMN INTERFACE

| OBJECT TYPE TABLE ID (88a) | OBJECT TYPE ENTRY ID (88b) | OBJECT TYPE (88c) | |
|---|---|---|---|
| OBJECT TYPE ATTR TABLE ID (90a) | OBJECT TYPE ATTR ENTRY ID (90b) | OBJECT TYPE ATTR IDs (90c) | OBJECT TYPE ATTR VALUES (90d) |

88 = top row; 90 = bottom row

*Figure 6b*

```
NS_NAME-Files                                           ─146
NS_ATTR-((NS_MANAGER,junk,<$CEPATH/fns_mgr.so>))        ─148
NS_ENTRIES-(
    (
        (FNS_TYPE,refto-Types,<binder-prog>)    ─142a  ⎫
        (FNS_FILENAME,str,<binder>)             ─142b  ⎬ 142
    )
    (
        (FNS_TYPE,refto-Types,<default-app>)    ─144a  ⎫
        (FNS_FILENAME,str,<default app>)        ─144b  ⎬ 144
    )
)
```

```
NS_NAME-Types
NS_ATTR-((NS_MANAGER,string, <$CEPATH/tns_mgr.so>))
NS_ENTRIES- (
        (TYPE_NAME,type-id,<binder-prog>)
        (TYPE_ICON,icon-file,<$OPENWINHOME/include/images/bind.icon>)
        (TYPE_ICON_MASK,icon-file,<$OPENWINHOME/include/images/bind.mask.icon>)
        (TYPE_FGCOLOR,color,<91 229 229>)
        (TYPE_BGCOLOR,color,<91 126 229>)
        (TYPE_PRINT,string,<lpr -Plp>)
)
```

*Figure 8b*

```
/*
 * Get a matching entry in the files namespace
 */
    argcount - 3;
162a─ftype_ent - ce_get_entry (f_name_space, argcount, filename, buf, bufsize);
        ─────                 ─────         ─────     ─────    ───  ─────
                              162b          162c
    if ( !ftype_ent ) {
        fprintf( stderr, "No match in File Namespace\n");
        continue;
    }
164a─fns_type - ce_get_attribute (f_name_space, ftype_ent, fns_attr) ;
      ───────                     ─────         ─────     ─────
                                  164b          164c
    fprintf (stdout, "FNS_TYPE - %s\n", fns_type) ;
```

```
/*
* Get a matching entry in the type namespace found from
*getting type from the files namespace and find icon
*/
  argcount - 1;
  ttype_ent - ce_get_entry ( t_name_space, argcount, fns_type );
  if ( !ttype_ent {
    fprintf) stderr, "No match in Type Namespace\n");
    continue;
  }
  tns_icon - ce_get attribute (t_name_space, ttype_ent, tns_attr);
  fprintf (stdout, "TYPE_ICON - %s\n", tns_icon);
}
ce_quit ( );
cd_end ( );
exit (0);
}
```

*Figure 8d*

METHOD AND APPARATUS FOR DERIVING OBJECT TYPE AND OBTAINING OBJECT TYPE ATTRIBUTE VALUES

BACKGROUND OF THE INVENTION

1. Field of the Invention:

The present invention is related to the field of computer systems. More particularly, the present invention is a method and apparatus for deriving an object's object type and obtaining object type attribute values for the derived object type for an application.

2. Art Background

It is quite common in the computer industry to offer on any computer system a wide range of applications, such as desktop publishing, databases, spreadsheets, graphics and so on. It is also very common to provide a direct manipulation graphical user interface for the user to interact with these applications. These applications and the data they manipulate are implemented as objects, and the objects are represented to the user by icons. A user interacts with the applications by choosing and manipulating these icons.

The term object comes from the programming methodology known as object-oriented programming. An object is an entity comprising data and operations which can be invoked to manipulate the data. Each object has an object type. The object type defines the object operations, known as the methods, that can be performed on objects of that particular object type. The object operations, or methods, are implemented independent of the objects themselves. Additionally, one object type may inherit the object operations defined and implemented for other object types. For further description on object-oriented design and programming techniques, see B. Meyer, *Object-oriented Software Construction*, (Prentice Hall, 1988), pp. 65-372.

An icon is a two or three dimensional graphic image symbolically representing an object or operation that will be invoked on the object if the icon is chosen. For further description of direct manipulation graphic user interfaces, see, D. Robson, "Object Oriented Software System", BYTE, August 1981, p. 74, Vol. 6, No. 8, and L. Tesler, "The Small Talk Environment", BYTE, August 1981, p. 90, Vol. 6, No. 8. See also, U.S. Pat. No. Re. 32,632, reissued Mar. 29, 1988, and assigned to Apple Computer, Inc.; and U.S. patent application Ser. No. 07/323,774, filed Mar. 15, 1989 and its corresponding division and continuation applications, Ser. Nos. 07/458,596 and 07/619,665, filed Dec. 26, 1989 and Nov. 28, 1990 respectively, and assigned to the assignee of the subject application, Sun Microsystems, Inc. For further description of specific implementations of direct manipulation graphical user interfaces, for examples, OPEN WINDOWS, by Sun Microsystems, Inc., or others by manufacturers such as International Business Machines, and Apple Computer, Inc., the reader is directed to technical literature provided by these companies.

Typically, in a computer system with direct manipulation graphical user interface, there is a special application often called a desktop manager to invoke and manipulate the various applications when required by the user. The desktop manager displays the icons representing the objects and interprets user gestures such as clicking on the icons, dragging the icons from place to place and dropping the icons on other icons as being request from the user for certain methods to be invoked on the objects. To do so, the desktop manager maintains the necessary information such that it can identify the objects' object types, their methods, icons, other object type attributes, etc.

To further improve inter-operability between applications, it is often desirable for the applications to be able to invoke each other and/or share objects. Similarly, to do so, the various desktop applications must be able to identify the objects' object types, their methods, icons, other object type attributes, etc. One approach is for the applications to have their own facilities for maintaining the necessary information. However, different object types typically have different deriving attributes and different object type attributes. Furthermore, different "families" of object types are typically derived and their object type attributes obtained in different manners. Thus, this approach places a huge burden on the applications.

As will be described, the present invention overcomes the disadvantages of the prior art and provides a method and apparatus for deriving an object's object type and obtaining object type attribute values for the derived object type for an application. The method and apparatus of the present invention allows different object types to be derived with different deriving attributes and different object type attribute values to be obtained for different derived object types. Furthermore, the method and apparatus of the present invention allows different manners for deriving object types and/or obtaining object type attribute values for different "families" of object types. Thus, additional manners for deriving object types and/or obtaining object type attributes may be easily incorporated.

SUMMARY OF THE INVENTION

A method and apparatus for deriving an object's object type and obtaining object type attribute values for the derived object type for an application is disclosed, which has particular application to computer systems where applications and data manipulated by the applications are implemented in an object oriented manner.

Under the present invention, an object type and at least one object type deriving attribute are stored as an object type entry in an object type table having an object type table identifier. The object type table is in turn stored in a database. Similarly, the object type and at least one object type attribute value having a corresponding object type attribute identifier are stored as an object type attribute entry in an object type attribute table having an object type attribute table identifier. The object type attribute table is in turn also stored in the database.

An object type deriving manager having a plurality of object type deriving functions, and an object type attribute values obtaining manager having a plurality of object type attribute values obtaining functions, corresponding to the object type table and the object type attribute table, are provided for deriving object type and obtaining object type attribute values respectively. A row getting interface routine and a column getting interface routine are provided for invoking the functions of the object type deriving manager and the object type attribute values obtaining manager.

An object's object type and the object type's object type attribute values are derived and obtained respectively for an application by providing an object type table identifier, at least one object type deriving attribute, an object type attribute table identifier, and at least one object type attribute identifier to the row and column getting interface routines. In response, the row and column getting interface routines derive the object's object type from a stored object type entry, obtain the derived object type's object type attribute values from a stored object type attribute entry, and return the derived object type and the obtained object type attribute values to the application using the functions of the object type deriving and the object type attribute values obtaining managers.

Under the present invention, different object types may have different deriving object type attributes and different object type attributes. The object type and/or object type attribute tables may be locally and/or regionally customized. The customized versions of an object type table as well as the customized versions of an object type attribute table are stored in different databases. The present invention selects one version of the customized object type table and one version of the customized object type attribute table in accordance to a pre-determined precedence rule to derive an object's object type and to obtain the derived object type's object type attribute values. Object type may be stored in chained object type entries in different versions of the object type table. Similarly, object type attribute values may be stored in multiple chained object type attribute entries in multiple versions of the object type attribute table. The object type and object type attribute values are obtained from the object type entries and the object type attribute entries respectively following the chaining relationship.

Additionally, under the present invention, the manners in which the functions of the object type deriving manager derive an object type from an object type table and the manner in which the functions of the object type attribute values obtaining manager obtain object type attribute values from an object type attribute table are unique for the object type table and the object type attribute table respectively. Thus, additional manners for deriving object types and/or obtaining object type attribute values may be incorporated in relatively easy manners by adding additional object type and object type attribute tables, and their unique and corresponding object type deriving and object type attribute values obtaining managers.

BRIEF DESCRIPTION OF THE DRAWINGS

The features and advantages of the present invention will be apparent from the following detailed description of the preferred embodiment of the invention with references to the drawings in which:

FIGS. 4a-4b show an exemplary object type table format and an exemplary object type attribute table format used by the present invention.

FIGS. 6a-6b show the calling arguments for the row and column getting interface routines of the present invention in their preferred form.

FIGS. 8a-8d illustrate an exemplary application of the present invention.

NOTATIONS AND NOMENCLATURE

Figure 1:
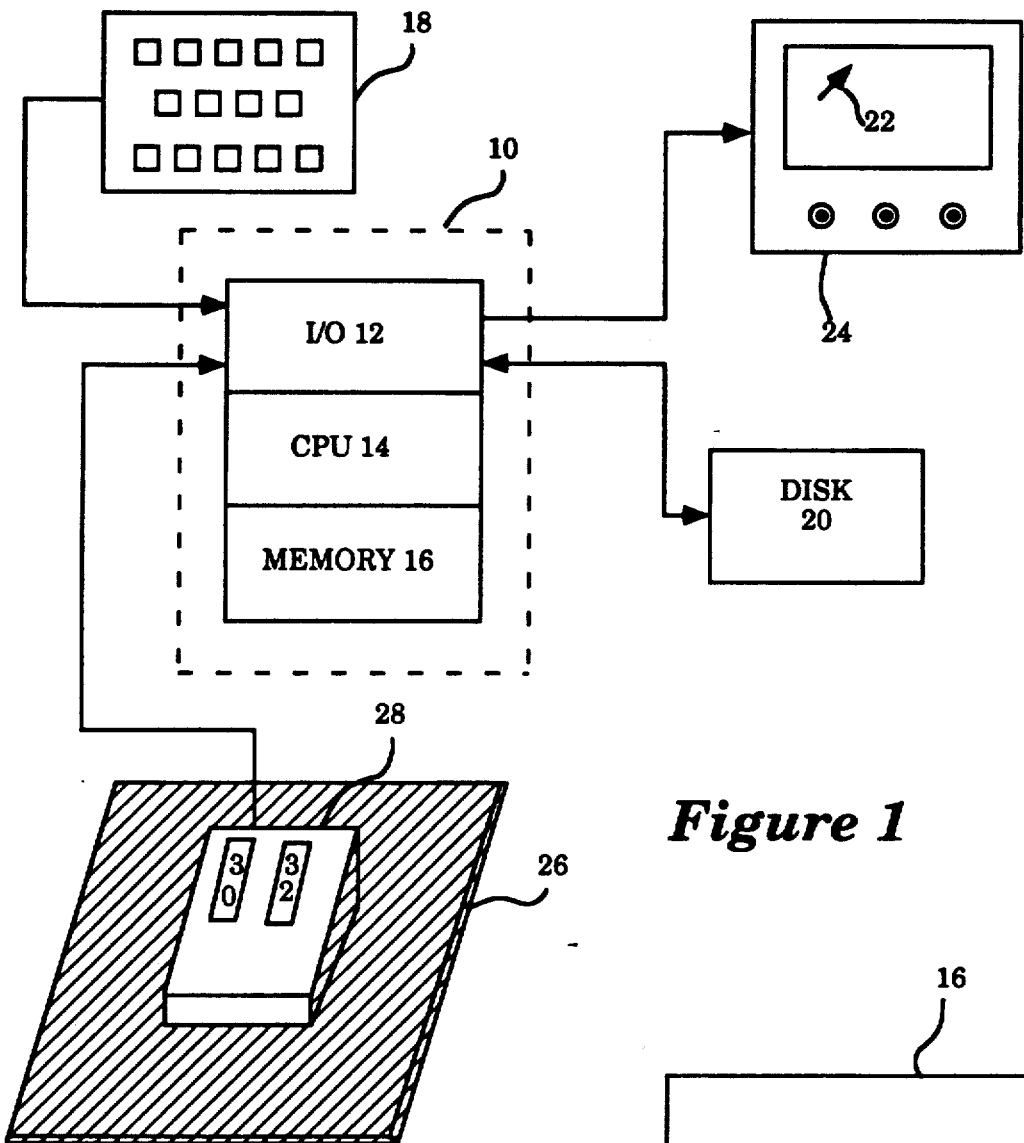
FIG. 1 illustrates a computer incorporating the teachings of the present invention.

The detailed description which follows is presented largely in terms of procedures executed on a central processing unit (CPU). These procedural descriptions and representations are the means used by those skilled in the art of computer systems to most effectively convey the substance of their work to others skilled in the art.

A procedure is here, and generally, conceived to be a self-consistent sequence of steps leading to a desired result. These steps are those that require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, objects, characters, terms, numbers, or the like. It should be borne in mind, however, that all these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operation described herein which form part of the present invention; the operations are machine operations. Useful machines for performing the operations of the present invention include general purpose digital computers or other similar devices. In all cases, it should be borne in mind the distinction between the method operations in operating a computer and the method of computation itself. The present invention relates to method steps for operating a computer in processing electrical or other physical signals to generate other desired physical signals.

The present invention also relates to apparatus for performing these operations. This apparatus may be specially constructed for the required purposes or it may comprise a general purpose computer as selectively activated or re-configured by a computer program stored in the computer. The procedures presented herein are not entirely related to any particular computer or other apparatus. In particular, various general purpose machines may be used with procedures written in accordance with the teaching herein, or it may prove more convenient to construct more specialized apparatus to perform the required method steps. The required structure for a variety of these machines will appear from the description given below.

DETAILED DESCRIPTION OF THE INVENTION

A method and apparatus for deriving an object's object type and obtaining the derived object type's object type attributes for an application is disclosed, which has particular application to computer systems where applications and data manipulated by the applications are implemented in an object oriented manner. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Referring now to FIG. 1, an exemplary computer system for deriving an object's object type and obtaining the derived object type's object type attribute values in accordance to the teachings of the present invention is illustrated. Shown is a computer 10 which comprises three major components. The first of these is an input-/output (I/O) circuit 12 which is used to communicate information in appropriately structured form to and from other portions of the computer 10. In addition, the computer 10 includes a central processing unit (CPU) 14 coupled to the I/O circuit 12 and a memory 16. These elements are those typically found in most general purpose computers, and, in fact, the computer 10 is intended to be representative of a broad category of computer systems.

A magnetic disk 20 is shown coupled to the I/O circuit 12 to provide additional storage capability for the computer 10. It will be appreciated that additional devices may be coupled to the computer 10 for storing data such as magnetic tape drives, as well as networks which are in turn coupled to other computer systems. As is well known, the disk 20 may store other computer programs, characters, routines, etc., which may be accessed and executed by the CPU 14.

A raster display monitor 24 is shown coupled to the I/O circuit 12 and is used to display images generated by the CPU 14. Any well known variety of raster (or pixmapped) display may be utilized as display 24. A keyboard 18 is shown coupled to the I/O circuit 12 and is used to input data and commands into the computer 10, as is well known. A cursor control device 28 is also shown coupled to the computer 10 through the I/O circuit 12. Any well known variety of cursor control device may be utilized for the cursor control device 28.

Figure 2:
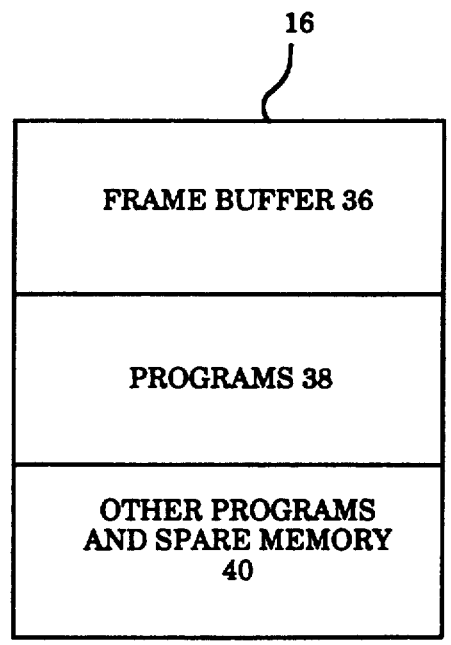
FIG. 2 shows one arrangement of program storage for the system of FIG. 1.

Referring now to FIG. 2, one arrangement of major programs contained within the memory 16 illustrated in FIG. 1 is shown. In particular, there is shown a frame buffer 36, which comprise a pixel map of the display 24. The frame buffer 36 represents the video memory for the display 24, wherein, each storage location in the frame buffer 36 corresponds to a pixel on the display 24. Thus, the frame buffer comprises a two dimensional array of points having known coordinates corresponding to the pixels on the raster display 24. The memory 16 also comprises a variety of programs implemented per the teaching of the present invention 38, as disclosed in this Specification, for execution by the CPU 10. Additionally, the memory 16 further comprises other programs for controlling or performing other well known functions and operation on computer systems.

Figure 3:
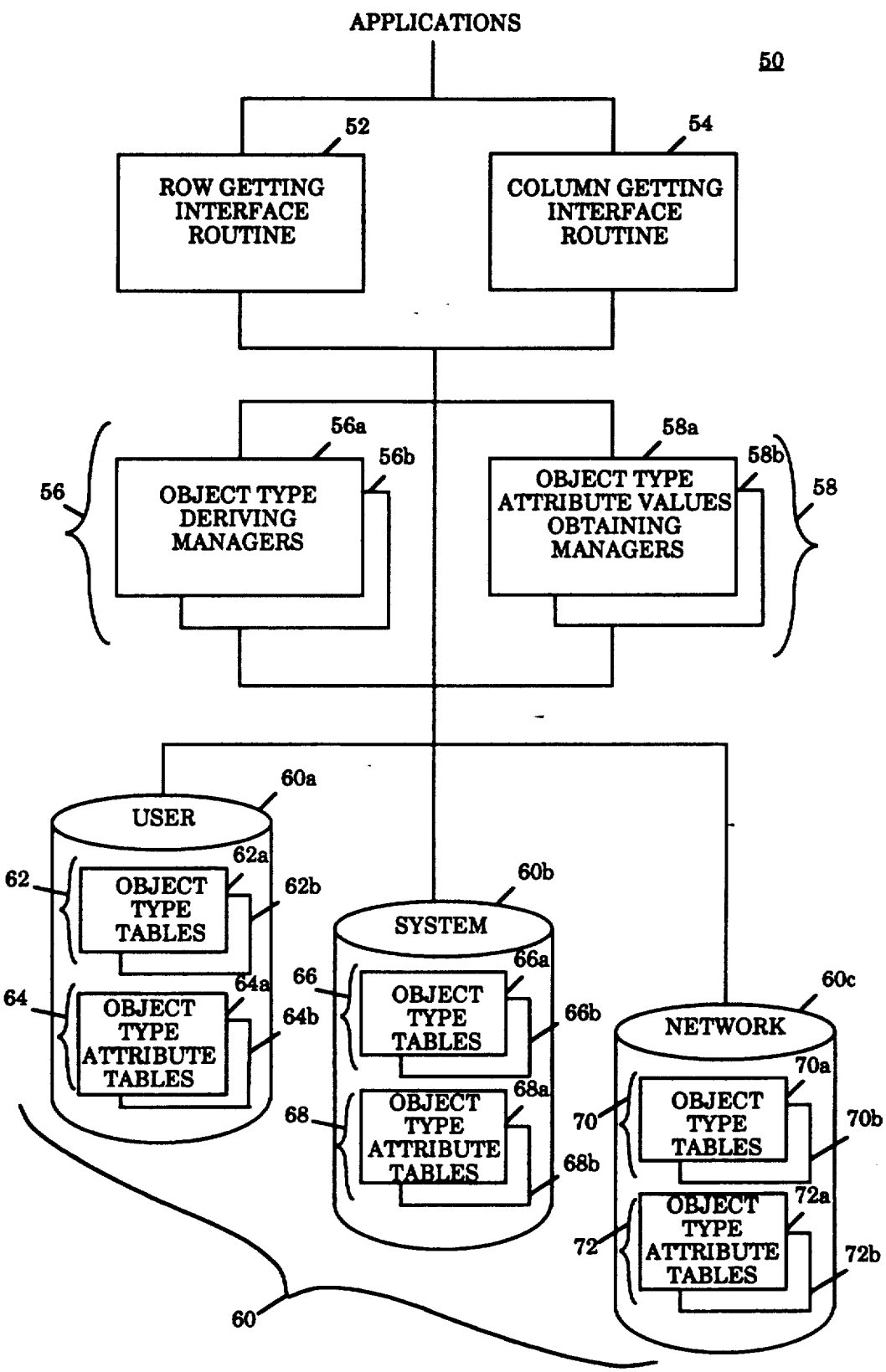
FIG. 3 shows a logical view of the preferred embodiment of the present invention.

Referring now to FIG. 3, a block diagram illustrating a logical view of the preferred embodiment of the present invention is shown. The preferred embodiment of the present invention comprises a plurality of databases 60, a plurality of object type deriving managers 56 and object type attribute value obtaining managers 58 logically coupled to the databases, and a plurality of interface routines 52, 54 logically coupled to the applications, the object type deriving managers 56, and the object type attribute value obtaining managers 58. These logical elements will each be discussed in further detail in order.

The preferred embodiment of the present invention comprises three databases 60, a user database 60a, a system database 60b, and a network database 60c, representing two levels of customization, the user level and the system level, of the network level. The three databases 60 are organized in an hierarchical relationship with the system database in a lower hierarchical relationship to the user database, and the network database in turn in a lower hierarchical relationship to the system database. It will be appreciated that the present invention may be practiced with one database, that is no customization, or more than three databases, that is more than two levels of customization.

Each database in the preferred embodiment 60a, 60b, 60c, comprises a plurality of object type tables 62, 66, 70, and a plurality of object type attribute tables 64, 67, 72. An object type table, e.g. 62a or 62b, in a database, e.g. 60a, may be a customized version of another object type table, e.g. 66a, 66b, 70a, or 70b, in another database, 60b or 60c. Similarly, an object type attribute table, e.g. 64a or 64b, in a database, e.g. 60a, may be a customized version of another object type attribute table, e.g. 68a, 68b, 72a, or 72b, in another database, 60b or 60c. In other words, each database 60a, 60b, 60c, comprises at most one customized version of an object type table 62a, 62b, 66a, 66b, 70a, 70b, and at most one customized version of an object type attribute table 64a, 64b, 68a, 68b, 72a, 72b.

It will be appreciated that not all object type tables 62a, 62b, 66a, 66b, 70a, or 70b, have to be customized. Likewise, not all object type attribute tables, 64a, 64b, 68a, 68b, 72a, or 72b have to be customized. For example, the network database may comprise object type tables A and B, and object type attribute tables C and D, while the system database comprises a customized version of the object type table A, an object type table E and a customized version of object type attribute table C, and the user database comprises another customized version of the object type table A, and an object type attribute table F.

The format of an object type table 62a, 62b, 66a, 66b, 70a, or 70b is dependent on the object type family and the corresponding object type deriving manager 56a or 56b. A block diagram illustrating an exemplary object type table format used by the present invention is shown in FIG. 4a. Similarly, the format of an object type attribute table 64a, 64b, 68a, 68b, 72a, or 72b is dependent on the object type family and the corresponding object type attribute value obtaining routine 58a or 58b. A block diagram illustrating an exemplary object type attribute table format used by the present invention is shown in FIG. 4b.

Referring now to FIG. 4a, the exemplary object type table 74 shown comprises a plurality of object type entries 76a-76c, one for each object type in the object type family. The exemplary object type table 74 may be used for an object type family such as "File_Type". In that case, the object type entries 76a-76c comprise an entry for each of the file types in the "File_Type" object type family, such as "Lotus", "Frame". (Lotus is a trademark of Lotus Development Inc., and Frame is a trademark of Frame Technology Corporation.)

Each object type entry 76a, 76b, 76c comprises a plurality of object type deriving attributes and an object type. Each object type entry 76a, 76b, 76c is identified by an object type entry identifier. The number of object type deriving attributes and the content of each object type deriving attribute in an object type entry are dependent on the manner the object type is derived. For example, for the "File_Type" object type family, some file types may be derived by the file names while others may be derived by the file names and the first n bytes of the files. Thus, in the "File_Type" object type table, some object type entries have one object type deriving attribute while others have two object type deriving attributes.

Additionally, in the preferred embodiment, if an object type table is customized, only the customized object type deriving attributes need to be stored in the customized object type entry in the customized version of the object type table. In other words, the customized object type deriving attributes and the object type may be stored in different object type entries in different versions of a customized object type table. The customized version of the object type table is stored in a higher level database. The customized object type entry is chained to the object type entry in the object type table in the lower level database, thereby allowing the object type to be derived by following the chaining relationship. Thus, object type deriving attributes may be customized in a relatively easy manner.

Referring now to FIG. 4b, the exemplary object type attribute table 78 shown comprises a plurality of object type attribute entries 80a-80c, one for each object type in the object type family. The exemplary object type attribute table 78 may be used for the earlier "File_Type" object type family. In that case, the object type attribute entries 80a-80c comprise an entry for each of the file types in the "File_Type" object type family.

Each object type attribute entry 80a, 80b, 80c comprises an object type, and a plurality of object type attribute values, for examples, the icon file name, the icon mask name, the foreground colors, and the background colors. Similarly, each object type attribute entry 80a, 80b, 80c is identified by an object type attribute entry identifier, and each object type attribute value is identified by an object type attribute identifier 82a, 82b, 82c. Likewise, the number of object type attribute values in an object type entry is dependent the object.

Additionally, in the preferred embodiment, if an object type attribute table is customized, only the customized object type attribute values need to be stored in the object type attribute entry in the customized version of the object type attribute table. In other words, the object type attribute values of an object type may be "scattered" in multiple object type attribute entries in multiple customized versions of the object type attribute table. The different versions of the object type attribute table are stored in different databases. The object type attribute entry in a version of the object type attribute table in a lower level database is chained to the object type attribute entry in the version of the object type attribute table in the next higher level database, thereby allowing the object type attribute values to be obtained by following the chaining relationship. Thus, object type attribute values for an object type may be customized in a relatively easy manner.

Referring back to FIG. 3, in the preferred embodiment, each of the object type deriving managers 56 provides a plurality of functions for deriving an object type entry identifier and for deriving an object type, and each of the object type attribute values obtaining managers 58 provides a plurality of functions for obtaining an object type attribute entry identifier and at least one object type attribute value. The object type deriving managers 56 and the object type attribute value obtaining managers 58 are unique and corresponding to the object type tables 62, 66, 70 and the object type attribute tables 64, 68, 72 respectively. In other words, for each object type table, regardless of the number of customized versions, 62a, 62b, 66a, 66b, 70a, 70b, there is an unique and corresponding object type deriving manager 56a or 56b for deriving an object type from the object type entries in the particular object type table. Similarly, for each object type attribute table, regardless of the number of customized versions, 64a, 64b, 68a, 68b, 72a, 72b, there is an unique and corresponding object type attribute value obtaining manager 58a or 58b for obtaining object type attribute values from the object type attribute entries in the particular object type table. Thus, additional manners for deriving object types and obtaining object type attributes for supporting additional families of object types may be incorporated in a relatively easy manner by adding additional object type and object type attribute tables, and their unique and corresponding object type deriving and object type attribute values obtaining managers.

The functions of an object type deriving manager 56a or 56b are invoked repeatedly by the row getting interface routine 52 and the column getting interface routine 54 to derive an object type entry identifier and an object type respectively. For each invocation, the invoked function of the object type deriving manager 56a or 56b receives at least one input argument from the invoking interface routine 52 or 54. The functions provided by an object type deriving manager 56a or 56b, their invocation and the input arguments for each invocation will be discussed in further detail later.

Similarly, the functions of an object type attribute values obtaining manager 58a or 58b are invoked repeatedly by the row getting interface routine 52 and the column getting interface routine 54 to derive an object type entry identifier and at least one object type attribute value. For each invocation, the invoked function of the object type deriving manager 58a or 58b receives at least one input argument from the invoking interface routine 52 or 54. The functions provided by an object type attribute values obtaining manager 58a or 58b, their invocation and the input arguments for each case will be discussed in further detail later.

The manner in which an object type deriving manager 56a or 56b derives an object type entry identifier or an object type, and therefore the functions provided by an object type deriving manager 56a or 56b are dependent on the object type family and the format of the object type table used. For the exemplary object type table format discussed earlier (FIG. 4a), the object type deriving manager 56a or 56b may derive the object type entry identifier and the object type by matching the input arguments against the object type deriving attributes in the object type entries and retrieving the object type from the matched object type entry, and if necessary by following the chaining relationships to the chained object type entries in the customized versions of the object type table. A block diagram illustrating an exemplary match and retrieve object type deriving manager used by the present invention for the exemplary object type table of FIG. 4a is shown in FIG. 5a.

Similarly, the manner in which an object type attribute values obtaining manager 58a or 58b obtains an object type attribute entry identifier or object type attributes values, and therefore the functions provided by an object type attribute values obtaining manager 58a or 58b, are dependent on the object type family and the format of the object type attribute table used. For the exemplary object type attribute table format discussed earlier (FIG. 4b), the object type attribute values obtaining manager 58a or 58b may obtain the object type attribute entry identifier by matching the input arguments against the object type in the object type attribute entries and retrieving the object type attribute values from the matched object type attribute entry; and if necessary by following the chaining relationships to the chained object type attribute entries in the customized versions of the object type attribute table. A block diagram illustrating an exemplary match and retrieve object type attribute values obtaining manager used by the present invention for the exemplary object type attribute table of FIG. 4b is shown in FIG. 5b.

Figure 5A:
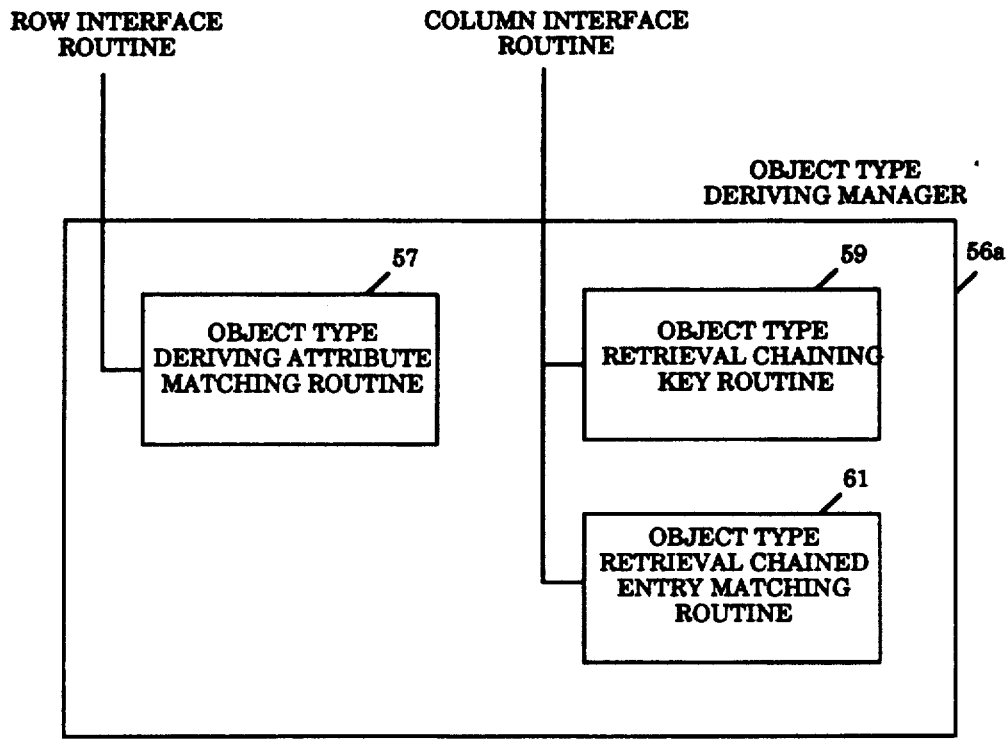
FIGS. 5a-5b show an exemplary object type deriving manager and an exemplary object type attribute values obtaining manager used by the present invention.
Figure 5B:
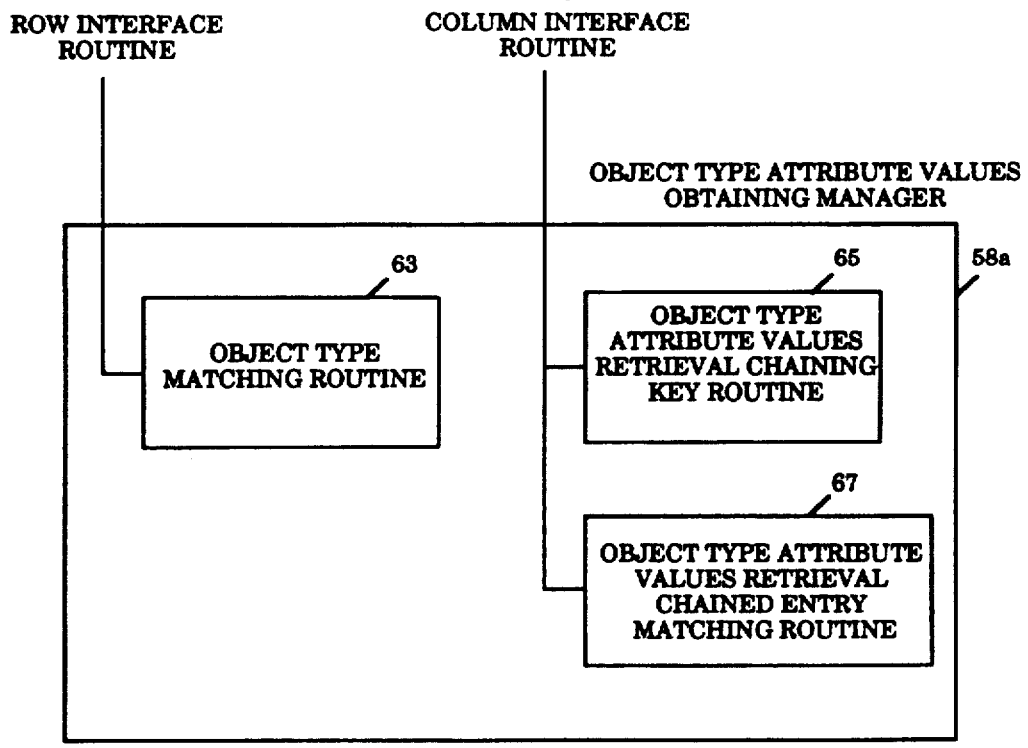

Referring now to FIG. 5a, the exemplary match and retrieve object type deriving manager 56a shown comprises an object type deriving attribute matching routine 57, an object type retrieval chaining key routine 59, and an object type retrieval chained entry matching routine 61. The object type deriving attribute matching routine 57 is called by the row getting interface routine to determine if an object type entry comprises matching object type deriving attributes. The object type retrieval chaining key routine 59, and the object type retrieval chained entry matching routine 61 are called by the column getting interface routine to determine if an object type entry is the chained entry.

The object type deriving matching routine 57 receives an object type entry identifier and at least one object type deriving attribute as input arguments. In response, if the deriving attribute input arguments match the object type deriving attributes in the object type entry identified by the object type entry identifier, the object type deriving matching routine 57 returns the object type entry identifier, else it returns a null value.

The object type retrieval chaining key routine 59 receives an object type entry identifier as input argument. In response, the object type retrieval chaining key routine 59 returns a chaining key. The chaining key comprises the object type deriving attributes. The object type retrieval chained entry matching routine 61 receives an object type entry identifier and a chaining key as input arguments. In response, if the chaining key input argument intersects with a subset of the object type deriving attributes of the object type entry identified by the object type entry identifier input argument, the object type retrieval chained entry matching routine returns a TRUE value, else it returns a FALSE value.

Referring now to FIG. 5b, the exemplary match and retrieve object type attribute values obtaining manager 58a shown comprises of an object type matching routine 63, an object type attribute values retrieval chaining key routine 65, and an object type attribute values retrieval chained entry matching routine 67. The object type matching routine 63 is called by the row getting interface routine to determine if an object type entry comprises matching object type. The object type attribute values retrieval chaining key routine 65, and the object type attribute values retrieval chained entry matching routine 67 are called by the column getting interface routine to determine if an object type attribute entry is the chained entry.

The object type matching routine 63 receives an object type attribute entry identifier and an object type as input arguments. In response, if the object type input argument matches the object type in the object type attribute entry identified by the object type attribute entry identifier, the object type matching routine 63 returns the object type attribute entry identifier input argument, else it returns a null value.

The object type attribute values retrieval chaining key routine 65 receives an object type attribute entry identifier as input argument. In response, the object type attribute retrieval chaining key routine 65 returns a chaining key. The chaining key comprises the object type and the object type attribute values. The object type attribute values retrieval chained entry matching routine 67 receives an object type attribute entry identifier and a chaining key as input arguments. In response, if the object type in the chaining key input argument matches the object type attributes of the object type attribute entry identified by the object type attribute entry identifier input argument, the object type attribute values retrieval chained entry matching routine returns a TRUE value, else it returns a FALSE value.

Referring back to FIG. 3, in the preferred embodiment, the row getting interface 52 routine is called by the application to derive an object type entry identifier or to obtain an object type entry attribute identifier, and the column getting interface routine 54 is called by the application to derive an object type or to obtain at least one object type attribute. The interface routine 52 or 54 receive input arguments for each call from the applications. In response, the interface routine 52 or 54 selects one version of an appropriate object type table 62a, 62b, 66a, 66b, 70a or 70b or one version of an appropriate object type attribute table 64a, 64b, 68a, 68b, 72a or 72b, in accordance to a predetermined precedence rule, and repeatedly calls the functions of the corresponding object type deriving manager, 56a or 56b, or the functions of the corresponding object type attribute values obtaining manager, 58a or 58b, to derive an object type or obtain the derived object type's object type attributes.

In the preferred embodiment, the version of a customized object type table and the version of a customized object type attribute table in the user database are selected over their respective versions in the system database; and their respective versions in the system database are selected over their respective versions in the network database.

For the exemplary object type deriving manager 56a or the exemplary object type attribute obtaining manager 58a of FIGS. 5a and 5b, the object type deriving attribute matching routine or the object type matching routine is called by the row getting interface routine 52 for each object type entry, or for each object type attribute entry, until an object type entry with matching object type deriving attributes or an object type attribute entry with matching object type is found.

Additionally, if the object type or the object type attributes need to be retrieved from a chained object type entry or a chained object type attribute entry, the object type retrieval chaining key routine or the object type attribute value retrieval chaining key routine is called by the column getting interface routine 54 to build a chaining key for the chained object type entry or the chained object type attribute entry in the next higher level object type table or the next higher level object type attribute table. Then, the object type retrieval chained entry matching routine or the object type attribute retrieval chained entry matching routine is called by the column getting interface routine 54, for each object type entry or each object type attribute entry in the next higher level object type table or the next higher level object type attribute table, until the chained entry is found or all entries are exhausted. If all object type entries or all object type attribute entries in the next higher level object type table or object type attribute table are exhausted without locating the chained entry, the process is repeated with the next higher level of the object type table or the next higher level of the object type attribute table until all levels of the tables are exhausted.

Referring now to FIG. 6a, a block diagram illustrating the two types of calls received by the row getting interface routine of the preferred embodiment of the present invention is shown. In the preferred embodiment, the row getting interface routine 52 receives two types of calls 84, 86 from the applications. For a type one call 84, an application provides an object type table identifier 84a and at least one object type deriving attribute 84b as arguments. The object type table identifier 84a identifies an object type table where the received object type deriving attributes 84b are to be used to derive an object type entry identifier 84c. As described earlier, the row getting interface routine locates the appropriate object type table and invokes the appropriate functions of the corresponding object type deriving manager to derive an object type entry identifier 84c. Upon receipt of the derived object type entry identifier 84c, the row getting interface routine returns it to the calling application.

For a type two call 86, an application provides an object type attribute table identifier 86a and an object type 86b as arguments. The object type attribute table identifier 86a identifies an object type attribute table where the received object type 86b are to be used to obtain an object type attribute entry identifier 86c. As described earlier, the row getting interface routine locates the appropriate object type table and invokes the appropriate functions of the corresponding object type attribute value obtaining manager to obtain an object type attribute entry identifier 86c. Upon receipt of the obtained object type attribute entry identifier 86c, the row getting interface routine returns it to the calling application.

Similarly, in the preferred embodiment, the column getting interface routine 54 receives two types of calls 88, 90 from the applications. For a type one call 88, an application provides an object type table identifier 84a, and an object type entry identifier 88b as arguments. The object type table identifier 88a identifies an object type table where the received object type entry identifier 88b is to be used to derive an object's object type 88c. As described earlier, the column getting interface routine locates the appropriate object type table and invokes the appropriate functions of the corresponding object type deriving manager to derive an object type 88c. Upon receipt of the derived object type 88c, the column getting interface routine returns it to the calling application.

For a type two call 90, an application provides an object type attribute table identifier 90a, an object type attribute entry identifier 90b, and at least one object type attribute identifier 90c as arguments. The object type attribute table identifier 90a identifies an object type attribute table where the received object type attribute entry identifier 90b and the received object type attribute identifiers are to be used to obtain object type attribute values 90d. As described earlier, the column getting interface routine locates the appropriate object type table and invokes the appropriate functions of the object type attribute values obtaining manager to obtain object type attribute values 90d. Upon receipt of the obtained object type attribute values 90d, the column getting interface routine returns them to the calling application.

Figure 7A:
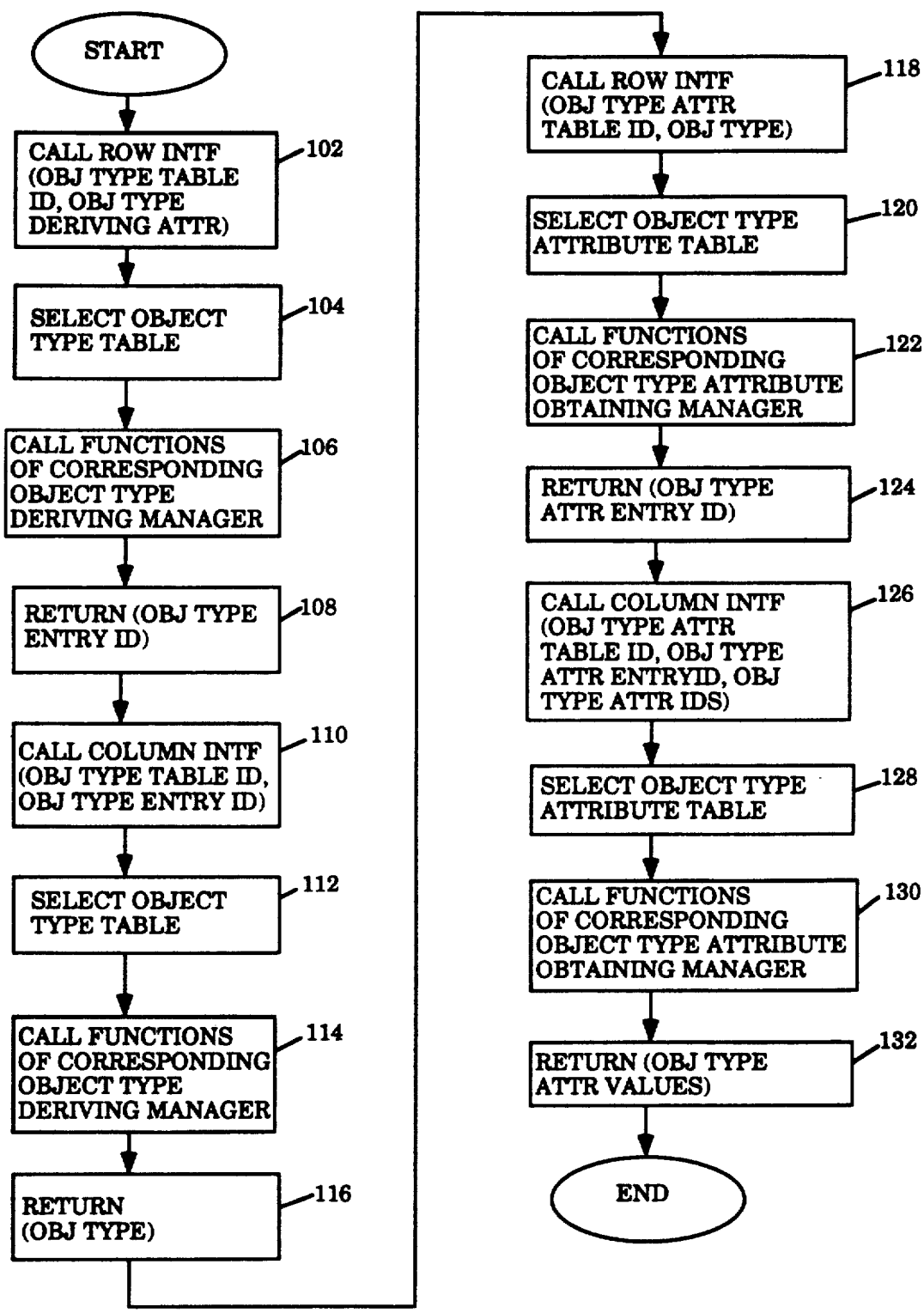
FIGS. 7a-7c are flow charts summarizing the operation flow for deriving an object's object type and obtaining object type attribute values for the derived object for an application under the present invention in its preferred form.
Figure 7B:
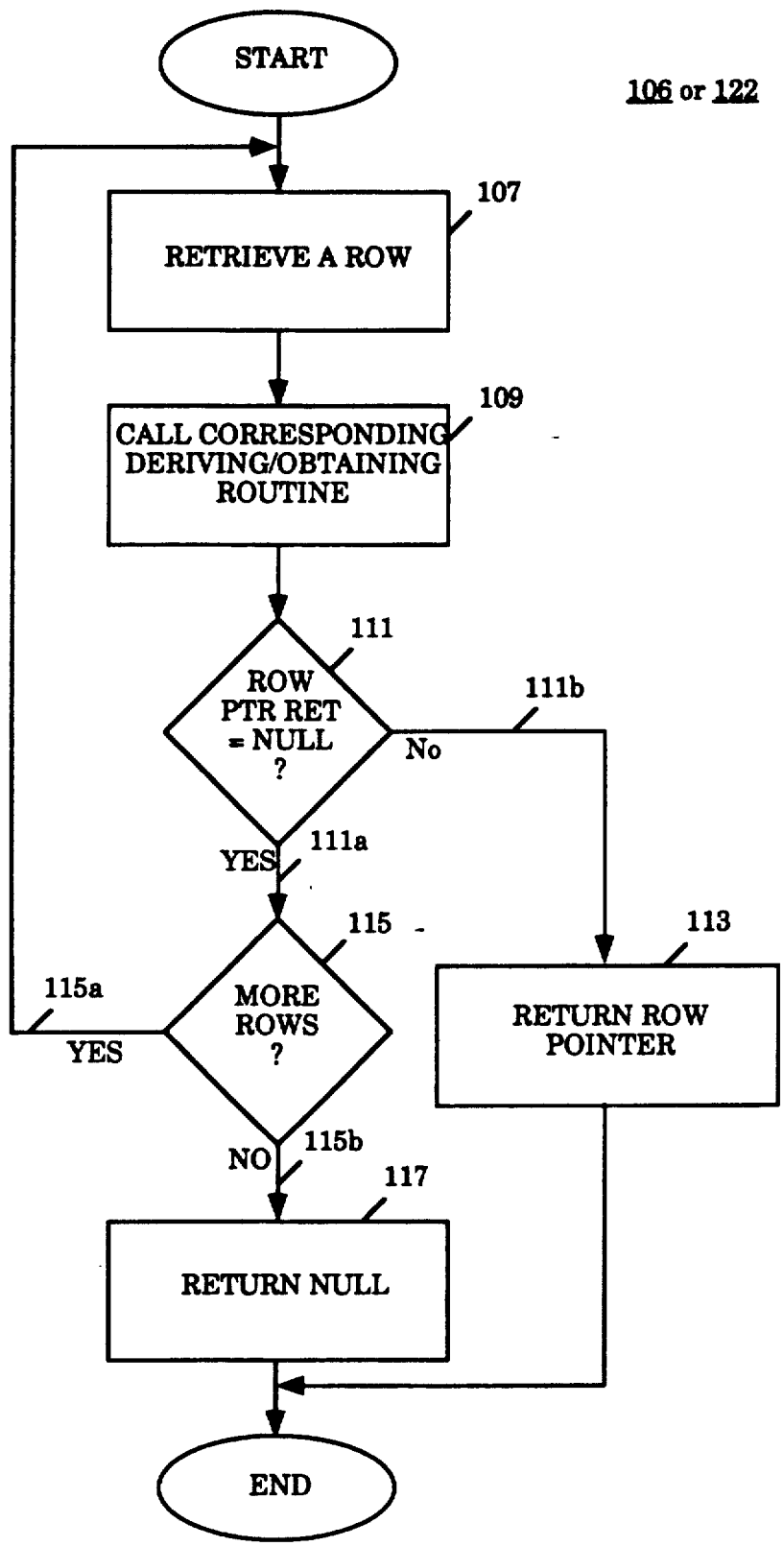
Figure 7C:
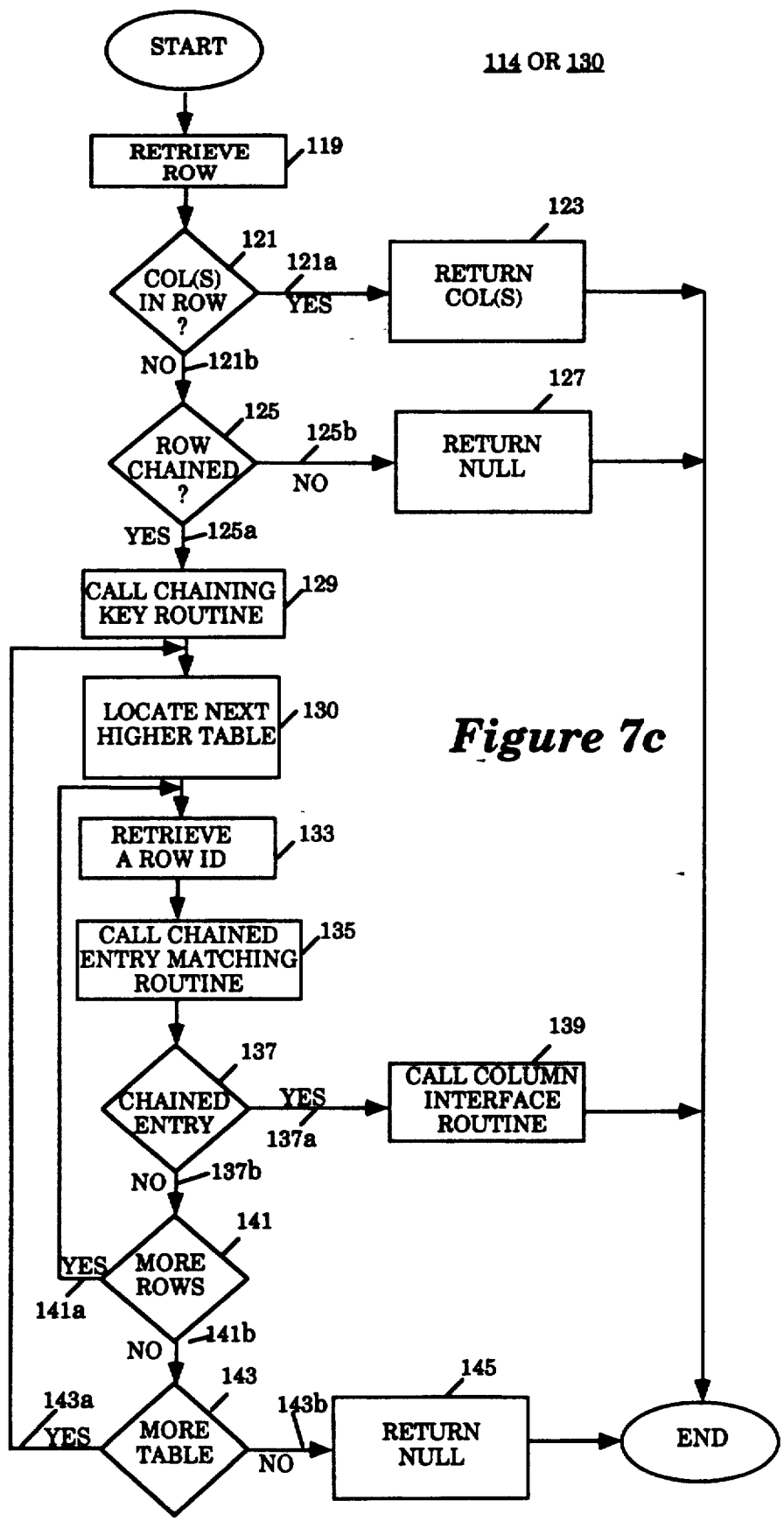

Referring now to FIGS. 7a–7c, three flow charts summarizing the operation flow for deriving an object's object type and obtaining object type attribute values for the derived object type for an application under the present invention in its preferred form is shown. As shown in FIG. 7a, initially, an application calls the row getting interface routine and provides an object type table identifier and at least one object type derivation attribute as arguments, block 102. As described earlier, in response, the row getting interface routine locates the appropriate object type table, block 104, and invokes the appropriate functions of the object type deriving manager to derive an object type entry identifier, block 106. Upon receipt of the derived object type entry identifier, the row getting interface routine returns it to the calling application, block 108.

Upon receipt of the derived object type entry identifier, the application then calls the column interface routine and provides an object type entry table identifier and the returned object type entry identifier as arguments, block 110. As discussed earlier, in response, the column getting interface routine locates the appropriate object type table, block 112, and invokes the appropriate functions of the object type deriving manager to derive an object type, block 114. Upon receipt of the derived object type, the column getting interface routine returns it to the calling application, block 116.

Upon receipt of the derived object type, the application then calls the row getting interface routine again and provides an object type attribute entry table identifier and the returned object type as arguments, block 118. As discussed earlier, in response, the row getting interface routine locates the appropriate object type attribute table, block 120, and invokes the appropriate functions of the object type attribute values obtaining manager to obtain an object type attribute identifier, block 122. Upon receipt of the obtained object type attribute identifier, the row getting interface routine returns it to the calling application, block 124.

Upon receipt of the obtained object type attribute entry identifier, the application then calls the column getting interface routine again and provides an object type attribute entry table identifier, the returned object type attribute entry identifier, and at least one object type attribute identifier as arguments, block 126. As discussed earlier, in response, the column getting interface routine locates the appropriate object type attribute table, block 128, and invokes the appropriate functions of the object type attribute values obtaining manager to obtain at least one object type attribute, block 130. Upon receipt of the obtained object type attribute values, the column getting interface routine returns them to the calling application, block 132.

FIG. 7b illustrates how the row getting interface routine calls either the functions of the object type deriving manager to derive an object type entry identifier or the functions of the object type attribute obtaining manager to obtain an object type attribute entry identifier. The row getting interface routine first retrieves an object type entry identifier or an object type attribute entry identifier, block 107. The row getting interface routine then calls the corresponding deriving or obtaining function, e.g. the object type deriving attribute matching routine or the object type matching routine described earlier, block 109. Upon receipt of the object type entry identifier or the object type attribute entry identifier, the row getting interface routine determines if the returned entry identifier has been set to null, block 111. If the returned entry identifier has not been set to null, branch 111b, the row getting interface routine returns the returned entry identifier to the calling application, block 113. Otherwise, branch 111a, the row getting interface routine determines if there is any more entry in the table, block 115.

If there is at least one entry remaining in the table, branch 115a, the row getting interface routine repeats blocks 107 through 111 and conditionally blocks 113 and 115, as described above; otherwise, branch 115b, the row getting interface routine returns a null value to the calling application, block 117.

FIG. 7c illustrates how the column getting interface routine calls either the functions of the object type deriving manager to derive an object type or the functions of the object type attribute obtaining manager to obtain at least one object type attribute. The column getting interface routine first retrieves the object type entry or the object type attribute entry, block 119. Then the column getting interface routine either determines if the object type is in the object type entry retrieved or determines if all the object type attributes are in the object type attribute entry retrieved, block 121.

If the object type is in the retrieved object type entry or all the object type attributes are in the retrieved object type attributes entry, branch 121a, the column getting interface routine returns the object type or the object type attributes, block 123. If the object type is not in the retrieved object type entry or not all the object type attributes are in the located object type attribute entry, branch 121b, the column getting interface routine determines if the retrieved entry is chained, block 125.

If the retrieved entry is not chained, branch 125b, the column getting interface routine returns a null value for the object type or for each of the "missing" object type attributes to the calling applications, block 127. If the retrieved entry is chained, branch 125a, the column getting interface routine calls the chaining key routine of either the object type deriving manager or the object type attribute obtaining manager, to get a chaining key, block 129. Upon receipt of the chaining key, the column getting interface routine then locates the next higher level table, block 131. The column getting interface routine retrieves an entry from the next higher level table, block 133, and calls the appropriate chained entry matching routine to determine if the retrieved entry is the chained entry, block 135.

If the retrieved entry is the chained entry, branch 137a, the column getting interface routine calls itself. If the retrieved entry is not the chained entry, branch 137b, the column getting interface routine determines if there is any entry remaining in the table, block 141. If there is at least one entry remaining in the table, branch 141a, the column getting interface routine repeats blocks 133 through 137, and conditionally blocks 139 and 141. If there is no entry remaining in the table, branch 141b, the column getting interface routine determines if there is another higher level table, block 143. If there is at least one more higher level table, branch 143a, the column getting interface routine repeats blocks 131 through 137 and conditionally blocks 139 through 143; otherwise, branch 143b, the column getting interface routine returns a null value for the object type or for each of the "missing" object type attributes.

Referring now to FIGS. 8a-8d, various code fragments in C illustrating an exemplary application of the present invention are shown. The exemplary application illustrates the derivation of a file's file type and obtaining the file type's file attribute values using the present invention. The key aspects of these code fragments are described below.

As described earlier, the file types "binder-prog" 142a and "default-app" 144a, and their file type deriving attributes "binder" 142b and "default|app" 144b, are stored as file type entries 142, 144 respectively in file type table "Files" 146. The unique and corresponding file type deriving routine for the file type table "Files" 146 is "fns_mgr" 148 (FIG. 8a).

The file type "binder-program" 152a and its file type attribute values 152b are stored as a file type attribute entry 152 in file type attribute table "Types" 154. Similarly the file type "default-app" and its file file type attribute values are stored as a file type attribute entry in the same file type attribute table (not shown). The unique and corresponding file type attribute value obtaining routine for the file type attribute table "Types" 154 is "tns_mgr" 156 (FIG. 8b).

The application calls the row getting interface routine "ce_get_entry" 162 to derive a file type entry identifier and stores the derived file type entry identifier in "ftype_ent" 162a. The application provides the file type table identifier "f_name_space" 162b and the file type deriving attributes "filename", the file's file name, and "buf", the first n bytes of the file, 162c as arguments. The application then calls the column getting interface routine "ce_get_attribute" 164 to derive the file type and stores the derived file type in "fns_type" 164a. The application provides the file type table identifier "f_name_space" 164b and the returned file type entry identifier "ftype_ent" 164c as arguments (FIG. 8c).

The application then calls the row getting interface routine "ce_get_entry" 172 again to obtain a file type attribute entry identifier and stores the obtained file type attribute entry identifier in "ttype_ent" 172a. The application provides the file type attribute table identifier "t_name_space" 172b and the derived file type "fns_type" 172c as arguments. The application then calls the column getting interface routine "ce_get_attribute" 174 again to obtain the file type attribute value for file type attribute "icon" and stores the obtained file type attribute value in "tns_icon" 174a. The application provides the file type attribute table identifier "t_name_space" 174b, the returned file type attribute entry identifier "type_ent", and the file type attribute identifier "tns_attr" 174d as arguments (FIG. 8d).

While the present invention has been described in terms of a preferred embodiment, those skilled in the art will recognize that the present invention is not limited to the preferred embodiment described. The method and apparatus of the present invention can be practiced with modification and alteration within the spirit and scope of the appended claims.

What is claimed is:

1. In a computer system comprising a central processing unit (CPU) executing a plurality of applications wherein said applications and data manipulated by said applications are implemented as objects having object types, a computer implemented method for deriving an object's object type and obtaining object type descriptive attribute values for the derived object type by an application, said method comprising the steps of:
   a) storing, separate from the object, the object's object type and a first set of object type deriving attributes in a first object type deriving entry of a first object type deriving table of a first database, said first object type deriving entry and said first object type deriving table having a first object type deriving entry identifier and a first object type deriving table identifier respectively, said first object type deriving table further having a corresponding first object type deriving table manager;
   b) providing said first object type deriving table identifier and said first set of object type deriving attributes to a first interface by the application;
   c) locating said first object type deriving table using said provided first object type deriving table identifier, retrieving said first object type entry identifier with the assistance of said corresponding first object type deriving table manager based on said provided first set of object type deriving attributes, and returning said retrieved first object type deriving entry identifier to the application by said first interface;
   d) providing said first object type deriving table identifier and said returned first object type deriving entry identifier to a second interface by the application;
   e) locating said first object type deriving table using said provided first object type deriving table identifier, retrieving the object's object type based on said provided first object type deriving entry identifier, and returning the object's object type to the application by said second interface.

2. The method as set forth in claim 1 wherein said object is a file, said file's object type is a file type, said first object type deriving table is a file type deriving table, and said provided first set of object type deriving attributes comprise said file's file name, said first object type deriving table manager is a file type deriving table manager;
   said file's file type being derived using said file type deriving table by said first and second interfaces with the assistance of said file type deriving table manager based on at least said file's file name provided by the application.

3. The method as set forth in claim 1 wherein said object is a file, said file's object type is a file type, said first object type deriving table is a file type deriving table, and said provided first set of object type deriving attributes comprise said file's first n bytes, said object type deriving table manager is a file type deriving table manager;
   said file's file type being derived using said first file type deriving table by said first and second interfaces with the assistance of said file type deriving table manager based on at least said file's first n bytes provided by the application.

4. The method as set forth in claim 1, wherein, said retrieval of said first object type deriving entry identifier in said step c) comprises the steps of:
   c.1) retrieving said first object type deriving entry identifier, providing said retrieved first object type deriving entry identifier and said provided first set of object type deriving attributes to said first object type deriving table manager by said first interface;
   c.2) retrieving said stored first set of object type deriving attributes based on said provided first object type deriving entry identifier, and matching said retrieved first set of object type deriving attributes against said provided first set of object type deriving attributes by said first object type deriving table manager; and
   c.3) returning said provided first object type deriving entry identifier unmodified to said first interface by said first object type deriving table manager.

5. The method as set forth in claim 1, wherein,
   said step a) further comprises storing, separate from another object, the other object's object type and a second set of object type deriving attributes in a second object type deriving entry of said first object type deriving table of said first database, said second object type deriving entry having a second object type deriving entry identifier;
   said retrieval of said first object type deriving entry identifier in said step c) comprises the steps of:
   c.1) retrieving an object type deriving entry identifier, providing said retrieved object type deriving entry identifier and said provided first set of object type deriving attributes to said first object type deriving table manager by said first interface;
   c.2) retrieving object type deriving attributes stored in the object type deriving entry identified by the provided object type deriving entry identifier, and matching said retrieved object type deriving attributes against said provided first set of object type deriving attributes by said first object type deriving table manager;
   c.3) returning said provided object type deriving entry identifier to said first interface by said first object type deriving table manager, said provided object type deriving entry identifier being returned unmodified if said retrieved object type deriving attributes and said provided first set of object type deriving attributes are matching, said provided object type deriving entry identifier being returned after it has been nullified by said first object type deriving table manager if said retrieved object type deriving attributes and said provided first set of object type deriving attributes are not matching;
   c.4) repeating said steps c.1) through c.3) by said first interface and said first object type deriving table manager if said returned object type deriving entry identifier is nullified and there is at least one other object type deriving entry in said first object type deriving entry table.

6. The method as set forth in claim 1, wherein,
   said step a) further comprises storing, separate from the object, the object's object type and a second set of object type deriving attributes in a second object type deriving entry of a second object type deriving table of a second database, said second object type deriving entry having a second object type deriving entry identifier, said second object type deriving table being identified by the same first object type deriving table identifier and managed by the same first object type deriving table manager, said second database being in a higher hierarchical relationship to said first database;

in said step b), said second set of object type deriving attributes is provided in lieu of said first set of object type deriving attributes;

in said step c), said second object type deriving table is located in lieu of said first object type deriving table based on said provided first object type deriving table identifier and said hierarchical relationship of said databases, said second object type deriving entry identifier is retrieved in lieu of said first object type deriving entry identifier based on said provided second set of object type deriving attributes, and said retrieved second object type deriving entry identifier is returned in lieu of said first object type deriving entry identifier;

in said step d), said returned second object type deriving entry identifier is provided in lieu of said first object type deriving entry identifier; and in said step e), said second object type deriving table is located in lieu of said first object type deriving table based on said provided first object type deriving table identifier and said hierarchical relationship of said databases, the object's object type stored in said second object type deriving entry is retrieved in lieu of the object's object type stored in said first object type deriving entry based on said provided second object type deriving entry identifier.

7. The method as set forth in claim 1, wherein, said step a) further comprises storing, separate from the object, a second set of object type deriving attributes in a second object type deriving entry of a second object type deriving table of a second database, said second object type deriving entry having a second object type deriving entry identifier, said second object type deriving table being identified by the same first object type deriving table identifier and managed by the same first object type deriving table manager, said second database being in a higher hierarchical relationship to said first database;

in said step b), said second set of object type deriving attributes is provided in lieu of said first set of object type deriving attributes;

in said step c), said second object type deriving table is located in lieu of said first object type deriving table based on said provided first object type deriving table identifier and said hierarchical relationship of said databases, said second object type deriving entry identifier is retrieved in lieu of said first object type deriving entry identifier based on said provided second set of object type deriving attributes, and said retrieved second object type deriving entry identifier is returned in lieu of said first object type deriving entry identifier;

in said step d), said returned second object type deriving entry identifier is provided in lieu of said first object type deriving entry identifier; and in said step e), said second object type deriving table is located first based on said provided first object type deriving table identifier and said hierarchical relationship of said databases, said second set of object type deriving attributes are retrieved based on said provided second object type deriving entry identifier, and a chaining key is built with the assistance of said first object type deriving table manager before said first object type deriving table is located based on said provided first object type deriving table identifier and said hierarchical relationship of said databases, additionally, the object's object type is retrieved from said first object type deriving entry based on said chaining key in lieu of said first object type deriving entry identifier.

8. The method as set forth in claim 1, wherein, said method further comprises the steps of:

f) storing, separate from the object, the object's object type and a first set of object type descriptive attribute values in a first object type descriptive entry of a first object type descriptive table of a second database, said first object type descriptive entry and said first object type descriptive table having a first object type descriptive entry identifier and a first object type descriptive table identifier respectively, said first set of object type descriptive attribute values also having a first set of corresponding object type descriptive attribute identifiers, said first object type descriptive table further having a corresponding first object type descriptive table manager;

g) providing said first object type descriptive table identifier and the object's object type to a third interface by the application;

h) locating said first object type descriptive table using said provided first object type descriptive table identifier, retrieving said first object type descriptive entry identifier with the assistance of said corresponding first object type descriptive table manager based on said provided object type, and returning said retrieved first object type descriptive entry identifier to the application by said third interface;

i) providing said first object type descriptive table identifier, said returned first object type descriptive entry identifier, and said corresponding first set of object type descriptive attribute identifiers to a fourth interface by the application;

j) locating said first object type descriptive table using said provided first object type descriptive table identifier, retrieving said first set of object type descriptive attribute values based on said provided first object type descriptive entry identifier and said provided corresponding first set of object type descriptive attribute identifiers, and returning said retrieved first set of object type descriptive attribute values to the application by said fourth interface.

9. The method as set forth in claim 8, wherein, said retrieval of said first object type descriptive entry identifier in said step h) comprises the steps of:

h.1) retrieving said first object type descriptive entry identifier, providing said retrieved first object type descriptive entry identifier and said provided object type to said first object type descriptive table manager by said third interface;

h.2) retrieving said stored object type based on said provided first object type descriptive entry identifier, and matching said retrieved object type against said provided object type by said first object type descriptive table manager; and h.3) returning said provided first object type descriptive entry identifier unmodified to said third interface by said first object type descriptive table manager.

10. The method as set forth in claim 8, wherein, said step f) further comprises storing, separate from another object, the other object's object type and a second set of object type descriptive attribute values in a second object type descriptive entry of said first object type descriptive table of said first database, said second object type descriptive entry having a second object type descriptive entry identifier, said second set of object type descriptive attribute values being identified by the same first set of object type descriptive attribute identifiers;

said retrieval of said first object type descriptive entry identifier in said step h) comprises the steps of:

h.1) retrieving an object type descriptive entry identifier, providing said retrieved object type descriptive entry identifier and the object's object type to said first object type descriptive table manager by said third interface;

h.2) retrieving an object type stored in the object type descriptive entry identified by the provided object type descriptive entry identifier, and matching said retrieved object type against said provided object type by said first object type descriptive table manager;

h.3) returning said provided object type descriptive entry identifier to said third interface by said first object type descriptive table manager, said provided object type descriptive entry identifier being returned unmodified if said retrieved object type and said provided object type are matching, said provided object type descriptive entry identifier being returned after it has been nullified by said first object type descriptive table manager if said retrieved object type and said provided object type are not matching;

h.4) repeating said steps h.1) through h.3) by said third interface and said first object type descriptive table manager if said returned object type descriptive entry identifier is nullified and there is at least one other object type descriptive entry in said first object type descriptive entry table.

11. The method as set forth in claim 8, wherein, said step a) further comprises storing, separate from the object, the object's object type and a second set of object type descriptive attributes in a second object type descriptive entry of a second object type descriptive table of a second database, said second object type descriptive entry having a second object type descriptive entry identifier, said second set of object type descriptive attribute values being identified by the same first set of object type descriptive attribute identifiers, said second object type descriptive table being identified by the same first object type descriptive table identifier and managed by the same first object type descriptive table manager, said second database being in a higher hierarchical relationship to said first database;

in said step h), said second object type descriptive table is located in lieu of said first object type descriptive table based on said provided first object type deriving table identifier and said hierarchical relationship of said databases, said second object type descriptive entry identifier is retrieved in lieu of said first object type descriptive entry identifier based on said provided object type, and said retrieved second object type descriptive entry identifier is returned in lieu of said first object type descriptive entry identifier;

in said step i), said returned second object type descriptive entry identifier is provided in lieu of said first object type descriptive entry identifier; and in said step j), said second object type descriptive table is located in lieu of said first object type descriptive table based on said provided first object type descriptive table identifier and said hierarchical relationship of said databases, said second set of object type descriptive attribute values are retrieved in lieu of said first set of object type descriptive attribute values based on said provided second object type descriptive entry identifier.

12. The method as set forth in claim 8, wherein, said step a) further comprises storing, separate from the object, a second set of object type descriptive attributes in a second object type descriptive entry of a second object type descriptive table of a second database, said second object type descriptive entry having a second object type descriptive entry identifier, said second set of object type descriptive attribute values being identified by a subset of said first set of object type descriptive attribute identifiers, said second object type descriptive table being identified by the same first object type descriptive table identifier and managed by the same first object type descriptive table manager, said second database being in a higher hierarchical relationship to said first database;

in said step h), said second object type descriptive table is located in lieu of said first object type descriptive table based on said provided first object type deriving table identifier and said hierarchical relationship of said databases, said second object type descriptive entry identifier is retrieved in lieu of said first object type descriptive entry identifier based on said provided object type, and said retrieved second object type descriptive entry identifier is returned in lieu of said first object type descriptive entry identifier;

in said step i), said returned second object type descriptive entry identifier is provided in lieu of said first object type descriptive entry identifier; and in said step j), said second object type descriptive table is located first based on said provided first object type descriptive table identifier and said hierarchical relationship of said databases, said second set of object type descriptive attribute values are retrieved based on said provided second object type descriptive entry identifier and said provided corresponding first set of object type descriptive attribute identifiers, and a chaining key is built with the assistance of said first object type descriptive table manager before said first object type descriptive table is located using said provided first object type deriving table identifier and said hierarchical relationship of said databases, additionally, a subset of said first set of object type descriptive attribute values not superseded by said second set of object type descriptive attribute values are retrieved from said first object type descriptive entry based on said provided corresponding first set of object type descriptive attribute identifiers and said chaining key in lieu of said first object type descriptive entry identifier, and said retrieved second set of object type descriptive attribute values and said retrieved subset of said first set of object type descriptive attribute values are returned in lieu of said first set of object type descriptive attribute values.

13. In a computer system comprising a central processing unit (CPU) executing a plurality of applications wherein said applications and data manipulated by said applications are implemented as objects having object types, an apparatus for deriving an object's object type and obtaining object type descriptive attribute values for the derived object type by an application, said apparatus comprising:

a) first storage means for storing, separate from the object, the object's object type and a first set of object type deriving attributes in a first object type deriving entry of a first object type deriving table of a first database for deriving the object's object type, said first object type deriving entry and said first object type deriving table having a first object type deriving entry identifier and a first object type deriving table identifier respectively;
 b) first object type deriving table manager means coupled to said first storage means for receiving said first object type entry identifier and said first set of object type deriving attributes as inputs, and confirming said received first object type entry identifier based on said received and stored first set of object type deriving attributes;
 c) first interface means coupled to said CPU, said first storage means and said first object type deriving table manager means for receiving said first object type deriving table identifier and said first set of object type deriving attributes from the application, locating said first object type deriving table using said received first object type deriving table identifier, retrieving said first object type deriving entry identifier, confirming said retrieved first object type deriving entry identifier with said first object type deriving table manager means, and returning said confirmed first object type deriving entry identifier to the application; and
 d) second interface means coupled to said CPU and said first storage means for receiving said first object type deriving table identifier and said returned first object type deriving entry identifier from the application, locating said first object type deriving table using said received first object type deriving table identifier, retrieving the object's object type using said received first object type deriving entry identifier, and returning the object's object type to the application.

14. The apparatus as set forth in claim 13 wherein
 said object is a file, said file's object type is a file type, said first object type deriving table is a file type deriving table, said first set of object type deriving attributes comprises said file's file name, and said first object type deriving table manager means is file type deriving table manager means,
 said file's file type being derived using said file type deriving table by said first and second interface means with the assistance of said file type deriving table manager means based on at least said file's file name received from the application.

15. The apparatus as set forth in claim 13 wherein
 said object is a file, said file's object type is a file type, said first object type table is a file type deriving table, said first set of object type deriving attributes comprises said file's first n bytes, and said first object type deriving table manager means is file type deriving table manager means,
 said file's file type being derived from said file type deriving table using at least said file's file name received from the application by said first and second interface means with the assistance of said file type deriving table manager means.

16. The apparatus as set forth in claim 13, wherein, said first object type deriving table manager means confirms said first object type deriving entry identifier by:

b.1) receiving said retrieved first object type deriving entry identifier and said first set of object type deriving attributes from said first interface means;
 b.2) retrieving said stored first set of object type deriving attributes based on said received first object type deriving entry identifier, and matching said retrieved first set of object type deriving attributes against said received first set of object type deriving attributes; and
 b.3) returning said received first object type deriving entry identifier unmodified to said first interface means.

17. The apparatus as set forth in claim 13, wherein,
 said first storage means further stores, separate from another object, the other object's object type and a second set of object type deriving attributes in a second object type deriving entry of said first object type deriving table of said first database, said second object type deriving entry having a second object type deriving entry identifier;
 said first interface means retrieves said first object type deriving entry identifier and confirms said retrieved first object type deriving entry identifier by:
  c.1) retrieving an object type deriving entry identifier, providing said retrieved object type deriving entry identifier and said received first set of object type deriving attributes to said first object type deriving table manager means,
  c.2) receiving said provided object type deriving entry identifier back from said first object type deriving table manager means, and determining whether said received back object type deriving entry identifier has been nullified by said first object type deriving table manager means,
  c.3) repeating said steps c.1) and c.2) if said received back object type deriving entry identifier has been nullified and there is at least one other object type deriving entry in said first object type deriving entry table;
 said first object type deriving table manager confirms a received first object type deriving entry identifier by:
  b.1) retrieving object type deriving attributes stored in the object type deriving entry identified by the received object type deriving entry identifier, and matching said retrieved object type deriving attributes against said received first set of object type deriving attributes,
  b.2) returning said provided object type deriving entry identifier to said first interface means, said received object type deriving entry identifier being returned unmodified if said retrieved object type deriving attributes and said received first set of object type deriving attributes are matching, said received object type deriving entry identifier being returned after it has been nullified if said retrieved object type deriving attributes and said received first set of object type deriving attributes are not matching.

18. The apparatus as set forth in claim 13, wherein,
said apparatus further comprises e) second storage means for storing, separate from the object, the object's object type and a second set of object type deriving attributes in a second object type deriving entry of a second object type deriving table of a second database, said second object type deriving entry having a second object type deriving entry identifier, said second object type deriving table being identified by the same first object type deriving table identifier and managed by the same first object type deriving table manager means, said second database being in a higher hierarchical relationship to said first database;

said first object type deriving table manager means being also coupled to said second storage means receives said second set of object type deriving attributes in lieu of said first set of object type deriving attributes;

said first interface means being coupled also to said second storage means locates said second object type deriving table in lieu of said first object type deriving table based on said received first object type deriving table identifier and said hierarchical relationship of said databases, retrieves said second object type deriving entry identifier in lieu of said first object type deriving entry identifier based on said received second set of object type deriving attributes, and returns said retrieved second object type deriving entry identifier in lieu of said first object type deriving entry identifier;

said second interface means being also coupled to said second storage means receives said returned second object type deriving entry identifier in lieu of said first object type deriving entry identifier, locates said second object type deriving table in lieu of said first object type deriving table based on said received first object type deriving table identifier and said hierarchical relationship of said databases, retrieves the object's object type stored in said second object type deriving entry in lieu of the object's object type stored in said first object type deriving entry based on said received second object type deriving entry identifier.

19. The apparatus as set forth in claim 13, wherein,
said apparatus further comprises e) second storage means for storing, separate from the object, a second set of object type deriving attributes in a second object type deriving entry of a second object type deriving table of a second database, said second object type deriving entry having a second object type deriving entry identifier, said second object type deriving table being identified by the same first object type deriving table identifier and managed by the same first object type deriving table manager means, said second database being in a higher hierarchical relationship to said first database;

said first object type deriving table manager means being also coupled to said second storage means receives said second set of object type deriving attributes in lieu of said first set of object type deriving attributes;

said first interface means being also coupled to said second storage means locates said second object type deriving table in lieu of said first object type deriving table based on said received first object type deriving table identifier and said hierarchical relationship of said databases, retrieves said second object type deriving entry identifier in lieu of said first object type deriving entry identifier based on said received second set of object type deriving attributes, and returns said retrieved second object type deriving entry identifier in lieu of said first object type deriving entry identifier;

said second interface means being also coupled to said second storage means receives said returned second object type deriving entry identifier in lieu of said first object type deriving entry identifier, locates said second object type deriving table first based on said received first object type deriving table identifier and said hierarchical relationship of said databases, retrieves said second set of object type deriving attributes based on said received second object type deriving entry identifier, and builds a chaining key with the assistance of said first object type deriving table manager before locating said first object type deriving table based on said received first object type deriving table identifier and said hierarchical relationship of said databases;

said second interface means further retrieves the object's object type from said first object type deriving entry based on said chaining key in lieu of said first object type deriving entry identifier.

20. The apparatus as set forth in claim 13, wherein, said apparatus further comprises:
e) second storage means for storing, separate from the object, the object's object type and a first set of object type descriptive attribute values in a first object type descriptive entry of a first object type descriptive table of a second database for describing entry of a first object type descriptive table of a second database for describing the object's object type, said first object type descriptive entry and said first object type descriptive table having a first object type descriptive entry identifier and a first object type descriptive table identifier respectively, said first set of object type descriptive attribute values also having a first set of corresponding object type descriptive attribute identifiers;

f) first object type descriptive table manager means coupled to said second storage means for receiving said first object type descriptive entry identifier and the object's object type as inputs, and confirming said received first object type descriptive entry identifier based on said received and stored object type;

g) third interface means coupled to said second storage means and said first object type descriptive table managers means for receiving said first object type descriptive table identifier and the object's object type from the application, locates said first object type descriptive table using said received first object type descriptive table identifier, retrieves said first object type descriptive entry identifier, confirming said retrieved first object type descriptive entry identifier with said first object type descriptive table manager, and returning said confirmed first object type descriptive entry identifier to the application; and h) fourth interface means coupled to said second storage means for receiving said first object type descriptive table identifier, said returned first object type descriptive entry identifier, and said corresponding first set of object type descriptive attribute identifiers from the application, retrieving said stored first set of object type descriptive attribute values, and returning said retrieved first set of object type descriptive attribute values to the application.

21. The apparatus as set forth in claim 20, wherein, said first object type descriptive table manager means confirms said first object type descriptive entry identifier by:
   f.1) receiving said retrieved first object type descriptive entry identifier and the object's object type from said third interface means;
   f.2) retrieving said stored object type based on said received first object type descriptive entry identifier, and matching said retrieved object type against said received object type; and
   f.3) returning said received first object type descriptive entry identifier unmodified to said third interface means.

22. The apparatus as set forth in claim 20, wherein, said second storage means further stores, separate from another object, the other object's object type and a second set of object type descriptive attribute values in a second object type descriptive entry of said first object type descriptive table of said first database, said second object type descriptive entry having a second object type descriptive entry identifier, said second set of object type descriptive attribute values being identified by the same first set of object type descriptive attribute identifiers;
said third interface means retrieves said first object type descriptive entry identifier and confirms said retrieved first object type descriptive entry identifier by:
   g.1) retrieving an object type descriptive entry identifier, providing said retrieved object type descriptive entry identifier and said received object type to said first object type descriptive table manager means,
   g.2) receiving said provided object type descriptive entry identifier back from said first object type descriptive table manager means, and determining whether said received back object type descriptive entry identifier has been nullified by said first object type descriptive table manager means,
   g.3) repeating said steps g.1) and g.2) if said received back object type descriptive entry identifier has been nullified and there is at least one other object type descriptive entry in said first object type descriptive entry table;
said first object type descriptive table manager confirms a received first object type descriptive entry identifier by:
   b.1) retrieving an object type stored in the object type descriptive entry identified by the received object type descriptive entry identifier, and matching said retrieved object type against said received object type,
   b.2) returning said provided object type deriving entry identifier to said first interface means, said received object type deriving entry identifier being returned unmodified if said retrieved object type and said received object type are matching, said received object type deriving entry identifier being returned after it has been nullified if said retrieved object type and said received object type are not matching.

23. The apparatus as set forth in claim 20, wherein, said apparatus further comprises i) third storage means for storing, separate from the object, the object's object type and a second set of object type descriptive attributes in a second object type descriptive entry of a second object type descriptive table of a second database, said second object type descriptive entry having a second object type descriptive entry identifier, said second set of object type descriptive attribute values being identified by the same first set of object type descriptive attribute identifiers, said second object type descriptive table being identified by the same first object type descriptive table identifier and managed by the same first object type descriptive table manager means, said second database being in a higher hierarchical relationship to said first database;
said third interface means being also coupled to said third storage means locates said second object type descriptive table in lieu of said first object type descriptive table based on said received first object type deriving table identifier and said hierarchical relationship of said databases, retrieves said second object type descriptive entry identifier in lieu of said first object type descriptive entry identifier based on said received object type, and returns said retrieved second object type descriptive entry identifier in lieu of said first object type descriptive entry identifier;
said fourth interface means being coupled to said third storage means receives said returned second object type descriptive entry identifier in lieu of said first object type descriptive entry identifier, locates said second object type descriptive table in lieu of said first object type descriptive table based on said received first object type descriptive table identifier and said hierarchical relationship of said databases, retrieves said second set of object type descriptive attribute values in lieu of said first set of object type descriptive attribute values based on said received second object type descriptive entry identifier.

24. The apparatus as set forth in claim 20, wherein, said apparatus further comprises i) third storage means for storing, separate from the object, a second set of object type descriptive attributes in a second object type descriptive entry of a second object type descriptive table of a second database, said second object type descriptive entry having a second object type descriptive entry identifier, said second set of object type descriptive attribute values being identified by a subset of said first set of object type descriptive attribute identifiers, said second object type descriptive table being identified by the same first object type descriptive table identifier and managed by the same first object type descriptive table manager means, said second database being in a higher hierarchical relationship to said first database;
said third interface means being also coupled to said third storage means locates said second object type descriptive table in lieu of said first object type descriptive table based on said received first object type deriving table identifier and said hierarchical relationship of said databases, retrieves said second object type descriptive entry identifier in lieu of said first object type descriptive entry identifier based on said received object type, and returns said retrieved second object type descriptive entry identifier in lieu of said first object type descriptive entry identifier;

said fourth interface means receives said returned second object type descriptive entry identifier in lieu of said first object type descriptive entry identifier, locates said second object type descriptive table is located first based on said received first object type descriptive table identifier and said hierarchical relationship of said databases, said second set of object type descriptive attribute values are retrieved based on said received second object type descriptive entry identifier and said received corresponding first set of object type descriptive attribute identifiers, and builds a chaining key with the assistance of said first object type descriptive table manager before locating said first object type descriptive table using said received first object type deriving table identifier and said hierarchical relationship of said databases, said fourth interface means further retrieves a subset of said first set of object type descriptive attribute values not superseded by said second set of object type descriptive attribute values from said first object type descriptive entry based on said received corresponding first set of object type descriptive attribute identifiers and said chaining key in lieu of said first object type descriptive entry identifier, and returns said retrieved second set of object type descriptive attribute values and said retrieved subset of said first set of object type descriptive attribute values in lieu of said first set of object type descriptive attribute values.

* * * * *